United States Patent
Wolter et al.

(10) Patent No.: US 10,338,579 B2
(45) Date of Patent: Jul. 2, 2019

(54) METHOD TO OPERATE A PORTABLE INPUT DEVICE THAT CONTROLS A MOTOR VEHICLE

(71) Applicant: FORD GLOBAL TECHNOLOGIES, LLC, Dearborn, MI (US)

(72) Inventors: Stefan Wolter, Wuerselen (DE); Florian Golm, Herzogenrath (DE); Juergen Wesemann, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/794,089

(22) Filed: Oct. 26, 2017

(65) Prior Publication Data
US 2018/0120830 A1    May 3, 2018

(30) Foreign Application Priority Data
Oct. 28, 2016    (DE) .................. 10 2016 221 273

(51) Int. Cl.
*G05D 1/00*    (2006.01)
*G05D 13/02*    (2006.01)
*B60H 1/00*    (2006.01)
*G06F 3/041*    (2006.01)
*G06F 3/0488*    (2013.01)
(Continued)

(52) U.S. Cl.
CPC ....... *G05D 1/0016* (2013.01); *B60H 1/00264* (2013.01); *B60H 1/00657* (2013.01); *G05D 13/02* (2013.01); *G06F 3/0414* (2013.01); *G06F 3/0488* (2013.01); *G06F 3/04847* (2013.01); *G08C 17/00* (2013.01)

(58) Field of Classification Search
CPC ...... G05D 1/0016; G05D 13/02; G08C 17/00; B60H 1/00657; B60H 1/00264; G06F 3/04847; G06F 3/0488; G06F 3/0414
See application file for complete search history.

(56) References Cited

U.S. PATENT DOCUMENTS

| | | | |
|---|---|---|---|
| 8,818,624 B2 * | 8/2014 | Small | B60K 35/00 701/36 |
| 9,798,422 B2 * | 10/2017 | Mueller | B60K 37/06 |
| 2006/0146036 A1 | 7/2006 | Prados et al. | |

(Continued)

FOREIGN PATENT DOCUMENTS

| DE | 19802249 A1 | 9/1999 |
|---|---|---|
| DE | 102013019572 A1 | 5/2015 |
| EP | 2546730 A2 | 1/2013 |

OTHER PUBLICATIONS

German Patent and Trademark Office, German Examination Report for the corresponding German Patent Application No. 10 2016 221 273.7 dated Mar. 29, 2019.

*Primary Examiner* — Anne M Antonucci
(74) *Attorney, Agent, or Firm* — Frank A. MacKenzie; Brooks Kushman P.C.

(57) ABSTRACT

The disclosure relates to a method for operating a portable input device to control a motor vehicle. The input device has a pressure-sensitive touchscreen. The input device generates control signals to control the motor vehicle, and transmit said signals to the motor vehicle. The control signal has at least one determinable parameter. The input device is designed to capture a pressure value of an actuating force of the touchscreen, and determine the parameter according to the captured pressure value.

11 Claims, 1 Drawing Sheet

(51) Int. Cl.
    *G06F 3/0484*     (2013.01)
    *G08C 17/00*     (2006.01)

(56) References Cited

U.S. PATENT DOCUMENTS

| | | |
|---|---|---|
| 2014/0092025 A1 | 4/2014 | Pala et al. |
| 2016/0090055 A1* | 3/2016 | Breed ............... B60R 16/037 701/2 |
| 2016/0147356 A1* | 5/2016 | Bai .................... G06F 3/044 345/173 |
| 2016/0214621 A1* | 7/2016 | Baalu .................. H04W 4/70 |
| 2016/0280095 A1 | 9/2016 | Frye et al. |
| 2018/0314383 A1* | 11/2018 | Li ...................... G06F 3/0412 |

\* cited by examiner

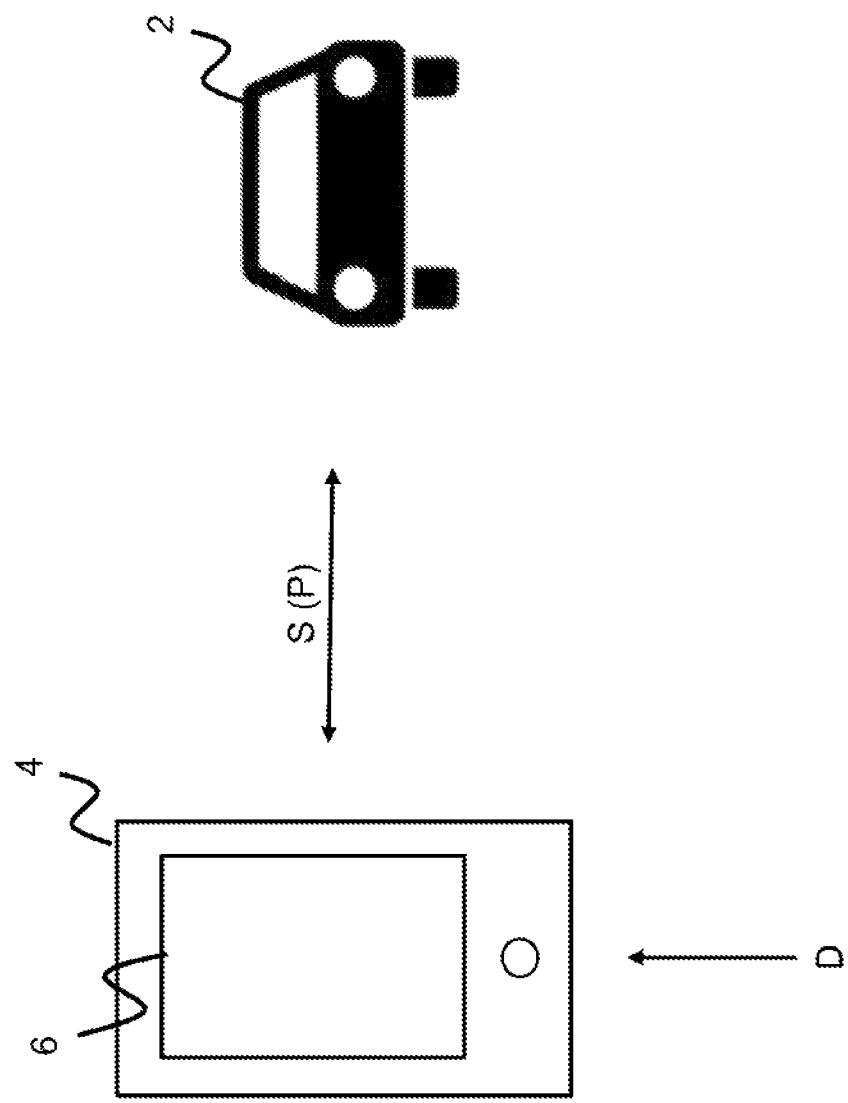

METHOD TO OPERATE A PORTABLE INPUT DEVICE THAT CONTROLS A MOTOR VEHICLE

CROSS-REFERENCE TO RELATED APPLICATIONS

This application claims foreign priority benefits under 35 U.S.C. § 119(a)-(d) to DE Application 10 2016 221 273.7 filed Oct. 28, 2016, which is hereby incorporated by reference in its entirety.

TECHNICAL FIELD

The disclosure relates to a method for operating a portable input device that controls a motor vehicle.

BACKGROUND

Portable input devices, for example smartphones or tablets, may be designed to control a motor vehicle, for example in order to carry out a parking operation, wherein a motor vehicle driver is outside the motor vehicle in this case and controlling the motor vehicle via the input device. In this case, control commands can be input via a touchscreen of the input device. However, such a simple adaptation of a determinable parameter for controlling the motor vehicle is not provided.

US 2006/0146036 A1 and US 2014/0092025 A1 each disclose a touchscreen that is assigned a pressure sensor for capturing the magnitude of an actuating force. In this case, the touchscreen is respectively installed as a component in the interior of a motor vehicle.

Therefore, the object of the disclosure is to show ways of making it possible to simplify control of a motor vehicle using a portable input device.

SUMMARY

The object of the disclosure is achieved using a method to operate a portable input device that controls a motor vehicle. The input device has a pressure-sensitive touchscreen, and is designed to generate control signals that control the motor vehicle. and the input device is also designed to transmit said signals to the motor vehicle. The control signal has at least one determinable parameter. The input device is designed to capture a pressure value of an actuating force of the touchscreen and to determine the parameter according to the captured pressure value. In this case, a portable input device is understood as meaning an input device that is not, or cannot be, structurally connected to the motor vehicle, but rather are separate input devices that can be temporarily connected to an associated motor vehicle via a wireless data transmission connection. A touchscreen (previously: "touch-sensitive screen") is understood as meaning a combined input and output device in which a program sequence of the input device can be directly controlled by touching parts of an image displayed on the touchscreen. A touchscreen therefore allows inputs by touching the touchscreen, for example via a finger. An additional, further input possibility for a determinable parameter is provided by capturing and evaluating a pressure value of an actuating force, thus providing a simple input possibility for a value from a range of values for the parameter.

According to one embodiment, the input device is designed such that the pressure value can be assigned to one of a plurality of parameters. The motor vehicle driver can therefore determine, for example via a menu, which parameter can be determined by the magnitude of the pressure value. Individual adaptation to the needs and/or preferences of the motor vehicle driver is therefore possible.

According to another embodiment, the pressure value is able to be assigned to a parameter for a speed of the motor vehicle and/or for an interior temperature of the motor vehicle. The values can therefore be determined in a particularly simple manner.

According to another embodiment, the pressure value is assigned to a speed of the motor vehicle and/or to an interior temperature of the motor vehicle. These are therefore presettings and therefore fixed assignments, with the result that a motor vehicle driver does not have to carry out any configurations on the basis of a menu.

According to another embodiment, the input device is in the form of a handheld device. A handheld device is understood as meaning a portable electronic device having a power supply via rechargeable batteries or batteries for different applications. It is so small and light that it can be held in only one hand during use and therefore has the designation handheld. Such a handheld device may be, for example, a smartphone or a tablet. In this case, a smartphone is understood as meaning a mobile telephone (colloquially cellphone), which provides considerably more comprehensive computer functionalities and connectivity than a conventional "pure" mobile telephone. Touchscreens or touch-sensitive screens are a central feature of modern smartphones. An important feature is also the fact that additional programs can be easily installed via Internet download portals, and are by now available for a wide variety of intended applications. A tablet or tablet computer, or tablet PC, is understood as meaning a portable, flat computer in a particularly lightweight embodiment with a touchscreen. On account of the lightweight design and the touch-sensitive screen, tablets are distinguished by simple handling. The devices resemble smartphones in terms of performance scope, operation and design and usually use operating systems originally developed for smartphones. The range of functions of a tablet can also be extended by additional programs (called apps, from the English "applications").

The disclosure also includes a computer program product that is designed to carry out such a method and an input device having such a computer program product.

The disclosure will now be explained with reference to a drawing. In the drawing:

BRIEF DESCRIPTION OF THE DRAWINGS

The FIGURE shows a schematic illustration of an operating scenario using a portable input device.

DETAILED DESCRIPTION

As required, detailed embodiments of the present disclosure are disclosed herein; however, it is to be understood that the disclosed embodiments are merely exemplary of the disclosure that may be embodied in various and alternative forms. The FIGURE are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 shows an operating scenario in which a motor vehicle 2 is controlled by a motor vehicle driver using a portable input device 4 in order to carry out a parking operation, for example, in which the motor vehicle driver is not in the motor vehicle 2.

In the present exemplary embodiment, the portable input device 4 is in the form of a smartphone having a touchscreen 6. Unlike the present exemplary embodiment, the portable input device 4 may also be in the form of another handheld device, for example a tablet having a touchscreen 6.

The portable input device 4 is set up, in terms of programming, to read in inputs by the motor vehicle driver on the touchscreen 6, and convert the inputs into control signals S that are transmitted from the portable input device 4 to the motor vehicle 2 via a wireless data connection. In this case, the motor vehicle 2 is designed, in response to reception of control signals S, to perform movements associated with said signals by carrying out corresponding steering, acceleration and/or braking operations.

In the present exemplary embodiment, the touchscreen 6 is also designed to capture a pressure value D of an actuating force of the touchscreen 6, and determine a parameter P according to the captured pressure value D. In other words, the touchscreen 6 can capture the force with which actuation is affected. A control signal S having a determinable parameter P can therefore be generated and transmitted to the motor vehicle 2. In this case, the parameter P has a value that is representative of a magnitude of the pressure value D. A value from a range of values for the parameter P can therefore be easily predefined.

During operation, the motor vehicle driver can assign the pressure value D to one parameter P of a plurality of parameters P using a menu of the portable input device 4. In this case, the plurality of parameters P may comprise parameters for a speed of the motor vehicle 2 and an interior temperature of the motor vehicle 2. In the present exemplary embodiment, the motor vehicle driver selects the speed for each parameter P.

Alternatively or additionally, provision may be made for the portable input device 4 to have a presetting such that the pressure value D, for example, is assigned to a speed of the motor vehicle 2 and/or an interior temperature of the motor vehicle 2. Therefore, the motor vehicle driver does not need to assign the pressure value D to a particular parameter P via configuration before using the portable input device 4. In this case, provision may also be made for this presetting to be able to be changed via the menu, that is to say the motor vehicle driver can change the preset assignment of the pressure value D to the speed of the motor vehicle 2, with the result that the pressure value D is now assigned to the interior temperature of the motor vehicle 2, with the result that it is possible to predefine a desired interior temperature as a desired value for an air-conditioning system or automatic climate control of the motor vehicle 2 by exerting a compression force on the touchscreen 6.

An additional, further input possibility for a determinable parameter P is therefore provided by capturing and evaluating the pressure value D of an actuating force, thus providing a simple input possibility for a value from a range of values for the parameter P.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for operating a portable input device to control a motor vehicle comprising:
    generating an actuating force on a pressure-sensitive touchscreen of an input device to provide control signals that control the vehicle, wherein a pressure value of the actuating force is captured by the touchscreen; and
    transmitting the control signals to the motor vehicle to control the vehicle, the control signals including a parameter having a value representative of a magnitude of the pressure value, the parameter being assigned to control a speed of the vehicle according to the magnitude of the pressure value.

2. The method as claimed in claim 1 further comprising reassigning the parameter to control an interior temperature of the vehicle according to the magnitude of the pressure value.

3. The method as claimed in claim 2 wherein the reassigning of the parameter is accomplished using a menu presented on the touchscreen.

4. The method as claimed in claim 1, wherein the input device is a handheld device.

5. A control system comprising:
    an input device, having a pressure-sensitive touchscreen configured to capture a magnitude of a pressure value of an actuating force on the touchscreen, and to provide control signals including a parameter assigned according to a preset assignment and having a value representative of a the magnitude of the pressure value; and
    a vehicle configured to receive the control signals, and to operate at a speed according to the value of the parameter.

6. The control system as claimed in claim 5, wherein the input device is further configured to permit an operator to change the preset assignment of the parameter to control an interior temperature of the vehicle according to the magnitude of the pressure value.

7. The control system as claimed in claim 5, wherein the input device is a smartphone.

8. The control system as claimed in claim 5, wherein the input device is a tablet.

9. A system comprising:
    a portable input device having a pressure-sensitive touchscreen configured to capture a pressure value of an actuating force on the touchscreen, and to provide control signals; and
    a vehicle configured to receive the control signals, and to assign control of a speed of the vehicle to the pressure value such that, in response to the actuating force, the speed adjusts to the pressure value.

10. The input device as claimed in claim 9, wherein the portable input device is a smartphone.

11. The input device as claimed in claim 9, wherein the portable input device is a tablet.

* * * * *